United States Patent
Jalla

(10) Patent No.: US 12,067,521 B2
(45) Date of Patent: Aug. 20, 2024

(54) METHOD AND SYSTEM FOR OPTIMIZING SHIPPING METHODOLOGY FOR COLD FORMED STEEL STUDS

(71) Applicant: Consulting Engineers, Corp, Reston, VA (US)

(72) Inventor: Maharaj Jalla, Great Falls, VA (US)

(73) Assignee: Consulting Engineers, Corp., Reston, VA (US)

( * ) Notice: Subject to any disclaimer, the term of this patent is extended or adjusted under 35 U.S.C. 154(b) by 0 days.

(21) Appl. No.: 16/742,125

(22) Filed: Jan. 14, 2020

(65) Prior Publication Data

US 2021/0217121 A1   Jul. 15, 2021

(51) Int. Cl.
*G06Q 10/08*   (2024.01)
*G06Q 10/0631*   (2023.01)
*G06T 19/20*   (2011.01)

(52) U.S. Cl.
CPC ....... *G06Q 10/08* (2013.01); *G06Q 10/06315* (2013.01); *G06T 19/20* (2013.01); *G06T 2210/04* (2013.01); *G06T 2219/2008* (2013.01)

(58) Field of Classification Search
CPC ........ G06Q 50/28; G06Q 10/06; G06T 19/20; G06T 2210/04; G06T 2219/2008
See application file for complete search history.

(56) References Cited

U.S. PATENT DOCUMENTS

| | | | |
|---|---|---|---|
| 2005/0055181 A1* | 3/2005 | Verdura | G06F 30/00 703/1 |
| 2018/0253807 A1* | 9/2018 | Casper | G06Q 50/16 |
| 2018/0350011 A1* | 12/2018 | Heape | G06Q 30/06 |
| 2019/0156570 A1* | 5/2019 | Sanjurjo | G06K 9/00637 |

OTHER PUBLICATIONS

Jensen, Patrik, Thomas Olofsson, and Helena Johnsson. "Configuration through the parameterization of building components." Automation in Construction 23 (2012): 1-8. (Year: 2012).*
Rausch, Chris, Ben Sanchez, and Carl Haas. "Spatial parameterization of non-semantic CAD elements for supporting automated disassembly planning." Modular and Offsite Construction (MOC) Summit Proceedings (2019): 108-115. (Year: 2019).*

* cited by examiner

*Primary Examiner* — Scott M Tungate
(74) *Attorney, Agent, or Firm* — Andrew Morabito

(57) ABSTRACT

The present invention is a computer method for manufacturing and shipping building construction materials, comprising; reviewing, a building model, wherein the building model is comprised of sections and each section is comprised of a set of members; calculating, the properties of each member of the set of members for each section; arranging, the set of members of each section to form a bundle, wherein the bundle is an arrangement of the set of members based on a volume limitation of a shipping container; and adjusting, the bundle based on other bundles which are placed within the shipping container.

18 Claims, 7 Drawing Sheets

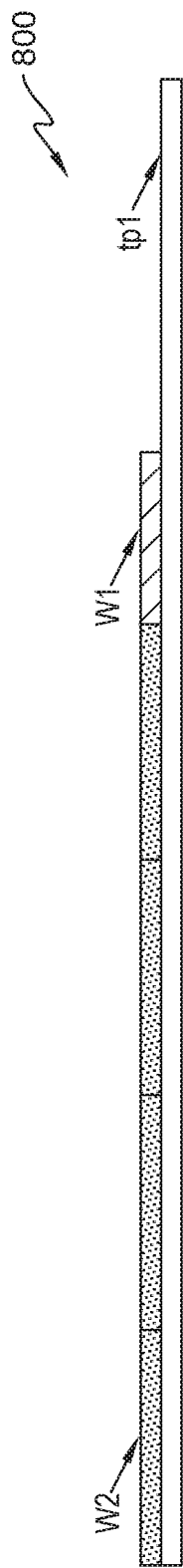
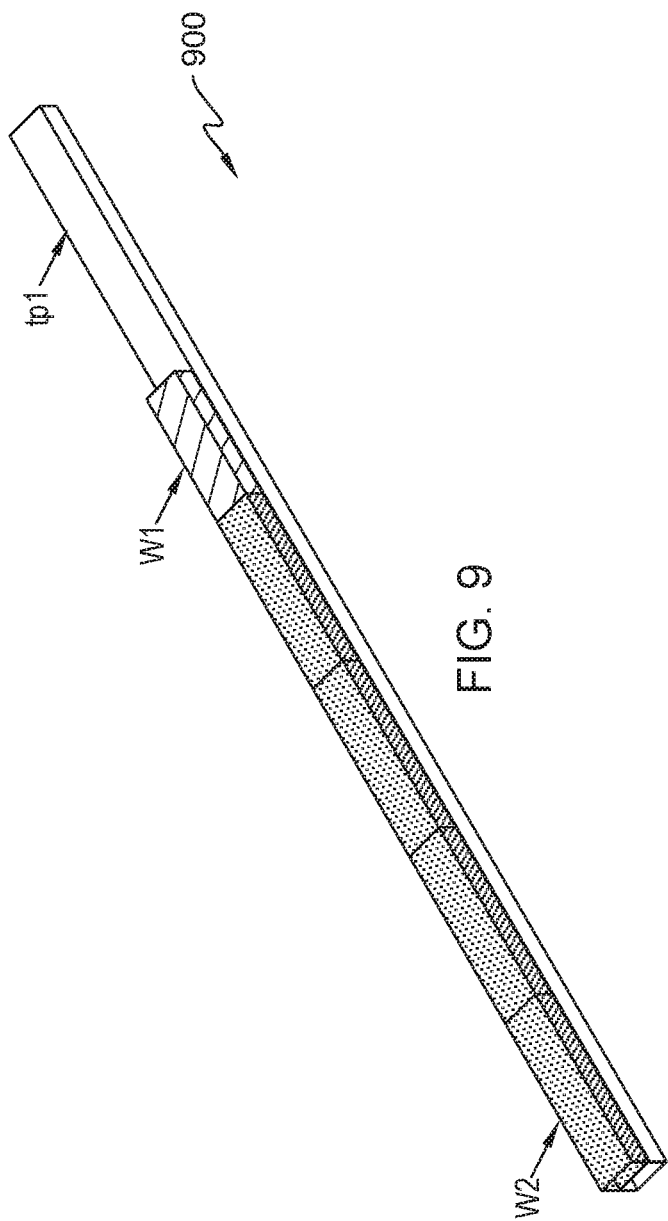

METHOD AND SYSTEM FOR OPTIMIZING SHIPPING METHODOLOGY FOR COLD FORMED STEEL STUDS

BACKGROUND

This disclosure relates to building construction and in particular, to a method, a computer program, or a computer system for optimization of the shipping methodology of cold formed steel material.

Cold formed steel studs are manufactured from the roll forming machines in various lengths as per the user inputs and the desired stud designs. Shipping or transportation of the cold formed steel studs is done to construction site by shipping containers. Cold formed steel studs are shipped to site in either plurality of the members bundled together as per different walls, roof trusses, floor truss joists and on site the bundles are unpacked and each wall panel, roof truss, floor truss joist is assembled together. In another method, the wall panels, roof trusses, floor truss joists are assembled and are shipped to the site and erected.

In current industry practice, the bundling of the studs together for shipping is not done in organized way. Each bundle occupies large volume and when the material is ship on site, due to the large volume of each bundle the space inside the shipping container is not utilized in most optimized way. Additionally, the bundles require the workers to know exactly which member goes where in the assembly of the sections. This also provides for the opportunity for a member to be misplaced or lost.

It is desirable for a system or program that is able to optimize the bundling or preparing of the cold formed steel studs in such a way that it will occupy least volume and shipping or transportation cost and time is reduced in the project.

SUMMARY

In a first embodiment, the present invention is a computer method for manufacturing and shipping building construction materials, comprising: reviewing, by one or more processors, a building model, wherein the building model is comprised of sections and each section is comprised of a set of members; calculating, by one or more processors, the properties of each member of the set of members for each section; arranging, by one or more processors, the set of members of each section to form a bundle, wherein the bundle is an arrangement of the set of members based on a volume limitation of a shipping container; and adjusting, by one or more processors, the bundle based on other bundles which are placed within the shipping container.

In a second embodiment, the present invention is a computer program product for manufacturing and shipping building construction materials, comprising: The computer program product comprising a computer readable storage medium having program instructions embodied therewith, the program instructions executable by a computing device cause the computing device to: program instructions to review a building model, wherein the building model is comprised of sections and each section is comprised of a set of members; program instructions to calculate the properties of each member of the set of members for each section; program instructions to arrange the set of members of each section to form a bundle, wherein the bundle is an arrangement of the set of members based on a volume limitation of a shipping container; and program instructions to adjust the bundle based on other bundles which are placed within the shipping container.

In a third embodiment, the present invention is a computer system for manufacturing and shipping building construction materials, comprising: a CPU, a computer readable memory and a computer readable storage medium associated with a computing device the computer program product comprising a computer readable storage medium having program instructions embodied therewith, the program instructions executable by a computing device cause the computing device to: program instructions to review a building model, wherein the building model is comprised of sections and each section is comprised of a set of members; program instructions to calculate the properties of each member of the set of members for each section; program instructions to arrange the set of members of each section to form a bundle, wherein the bundle is an arrangement of the set of members based on a volume limitation of a shipping container; and program instructions to adjust the bundle based on other bundles which are placed within the shipping container.

BRIEF DESCRIPTION OF THE DRAWINGS

Referring now to the drawings in which like reference numbers represent corresponding parts throughout:

FIG. 8 depicts a section view of the floor truss joist stud members from FIG. 7 stacked for shipping, in accordance with one embodiment of the present invention.

FIG. 9 depicts an isometric view of the floor truss joist stud members from FIG. 7 stacked for shipping, in accordance with one embodiment of the present invention.

DETAILED DESCRIPTION

This disclosure relates to building construction and in particular, to a method, a computer program, or a computer system for optimization of the shipping methodology of cold formed steel material. Cold formed steel studs are typically shipped to site in containers and the space inside the container has to be utilized in most optimized way to reduce the wastage of the space and maximum material to be shipped on site in one trip.

Typically, the construction material is either manufactured in Factory and ship to site or it is on site construction.

Pre-Engineering buildings which are one of the most popular construction methods in recent time has all the members which are pre-engineered and pre manufactured in Factory controlled environment. Cold formed steel buildings are the one such construction material which is manufactured in factory-controlled environment.

Figure 5:
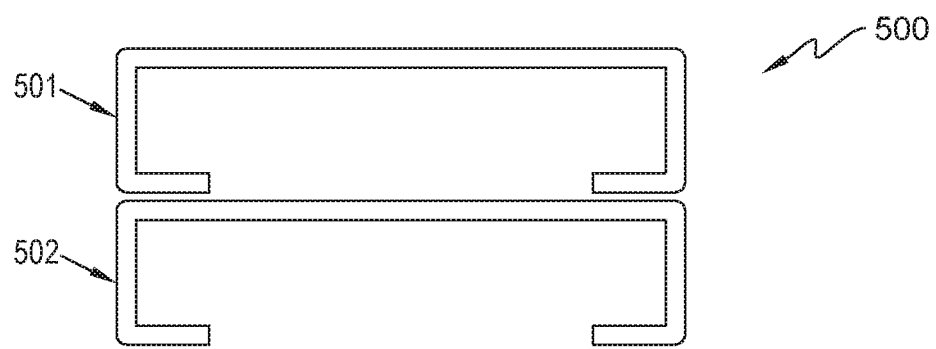
FIG. 5 depicts a view of the cold formed steel studs arranged to fit between each other for shipping, in accordance with one embodiment of the present invention.

Cold formed steel studs are generally of a "C" shape (Shown in FIG. 5). The roll forming from the machine is done using flat steel sheet inserted in the roll forming machine and using the rollers the steel sheet is bent to desired shape as per the user input. Cold formed steel studs have a cavity space inside the "C" shape and when shipped the cold formed steel members can utilize this shape to reduce the wasted space within the container.

In the present invention the concept of each cold formed steel member is fit in a way to minimize the wasted space within the container and maximize the number of members inside the container. One such technique is to slide one member into another (as shown in FIG. 5). Deciding which member to be fit inside which other members to maximize both the number of members in each row and column, the present system calculates the dimensions of each member, the container size, and determines the ideal packaging order of members to maximize the space.

Generally, based on the dimensions of the shipping container, the maximum limit of each bundle is determined. The length of the bundle cannot be longer than the maximum shipping container length. Additionally, the height and width of the container limit the bundle size as well and are set as maximum limits on each bundle.

The present invention provides for an advantage over the present packaging and shipping techniques by utilizing a unique optimization feature where the members for each wall panel, roof truss and floor truss joist are analyzed by the program, maximum dimensions of the shipping container are considered for the bundles, and the ideal bundling method is used to maximum the number of bundles inside each container. The present Invention can reduce the no. of shipping containers required to ship the material of the project construction from factory to site and reduce the cost of transportation, reduce the carbon footprint of the construction process, and save on vital natural resources.

The present invention may be a system, a method, and/or a computer program product. The computer program product may include a computer readable storage medium (or media) having computer readable program instructions thereon for causing a processor to carry out aspects of the present invention. The present invention is used in an embodiment with cold formed steel members, in alternative embodiments, various other applications may exist with other type of building materials or products.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
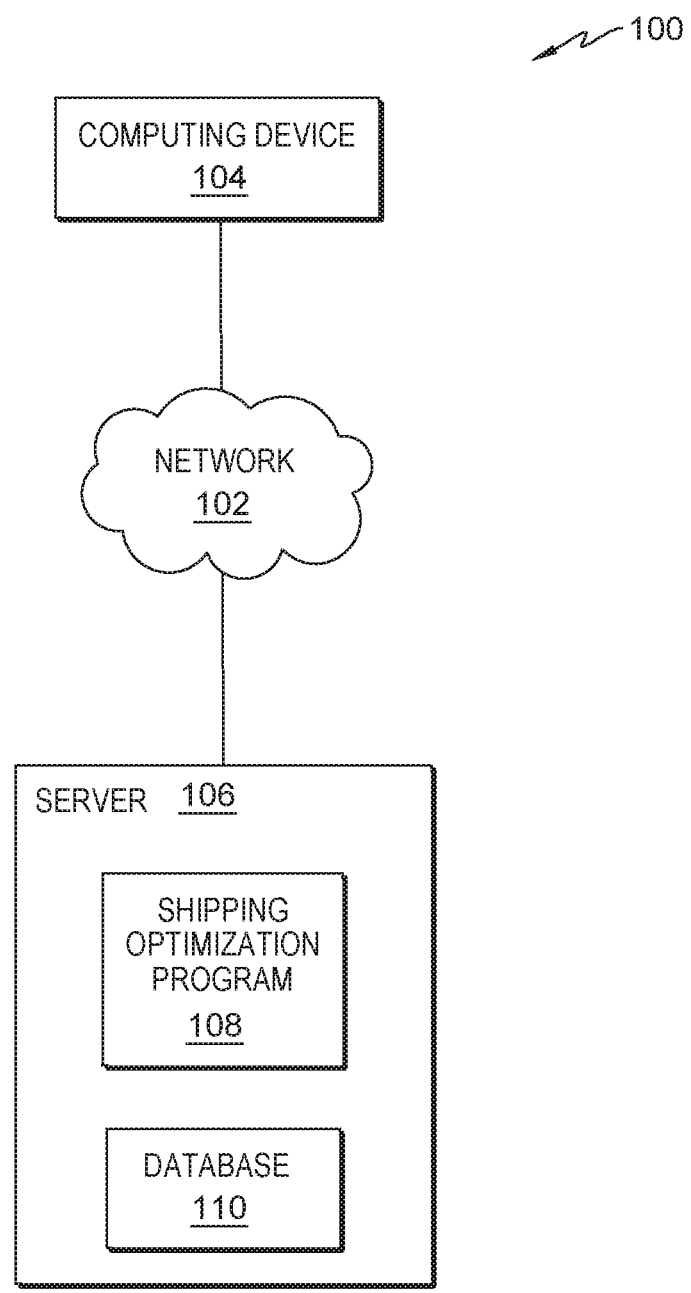
FIG. 1 depicts a block diagram depicting a computing environment, in accordance with one embodiment of the present invention.

FIG. 1 depicts a block diagram of a computing environment 100 in accordance with one embodiment of the present invention. FIG. 1 provides an illustration of one embodiment and does not imply any limitations regarding the environment in which different embodiments maybe implemented.

In the depicted embodiment, computing environment 100 includes network 102, computing device 104, and server 106. Computing environment 100 may include additional servers, computers, or other devices not shown.

Network 102 may be a local area network (LAN), a wide area network (WAN) such as the Internet, any combination thereof, or any combination of connections and protocols that can support communications between computing device 104 and server 106 in accordance with embodiments of the invention. Network 102 may include wired, wireless, or fiber optic connections.

Computing device 104 may be a management server, a web server, or any other electronic device or computing system capable of processing program instructions and receiving and sending data. In other embodiments, computing device 104 may be a laptop computer, tablet computer, netbook computer, personal computer (PC), a desktop computer, or any programmable electronic device capable of communicating with patient computing device 104 via network 102. In other embodiments, computing device 104 may be a server computing system utilizing multiple computers as a server system, such as in a cloud computing environment. In one embodiment, computing device 104 represents a computing system utilizing clustered computers and components to act as a single pool of seamless resources. Computing device 104 may include components, as depicted and described in further detail with respect to FIG. 1.

Server 106 may be a management server, a web server, or any other electronic device or computing system capable of processing program instructions and receiving and sending data. In other embodiments server 106 may be a laptop computer, tablet computer, netbook computer, personal computer (PC), a desktop computer, or any programmable electronic device capable of communicating via network 102. In one embodiment, server 106 may be a server computing system utilizing multiple computers as a server system, such as in a cloud computing environment. In one embodiment, server 106 represents a computing system utilizing clustered computers and components to act as a single pool of seamless resources. In the depicted embodiment shipping optimizing program 108 and database 110 are located on server 106. Server 106 may include components, as depicted and described in further detail with respect to FIG. 1.

shipping optimizing program 108 has the unique features to take all members of a wall, floor, roof, or a group of these building sections and determine a preferred manufacturing order and bundling process to maximize the number of members which can be placed within a single shipping container. The bundling process is further simplified by determining the preferred manufacturing order so that each member that comes out of the forming machine can be bundled one after the next and the workers do not need to bundle the members in a random or more complicated order. This also further assists with the unpacking at the work site in that the members are bundled in a way the workers can easily remove the bundles and assemble the sections in a methodical and efficient order.

In the depicted embodiment, the Shipping optimizing program 108 utilizes network 102 to access the computing device 104 and to communicate with database 110. In one embodiment, Shipping optimizing program 108 resides on computing device 104. In other embodiments, Shipping optimizing program 108 may be located on another server or computing device, provided Shipping optimizing program 108 has access to database 110.

Database 110 may be a repository that may be written to and/or read by optimization program 108. Information gathered from computing device 104 and the 1-dimensional, 2-dimensional, and 3-dimensional drawings and models as well as the requirements so that the assembly drawing in one embodiment, database 110 is a database management system (DBMS) used to allow the definition, creation, querying, update, and administration of a database(s). In the depicted embodiment, database 110 resides on computing device 104. In other embodiments, database 110 resides on another server, or another computing device, provided that database 110 is accessible to optimization program 108.

Figure 2:
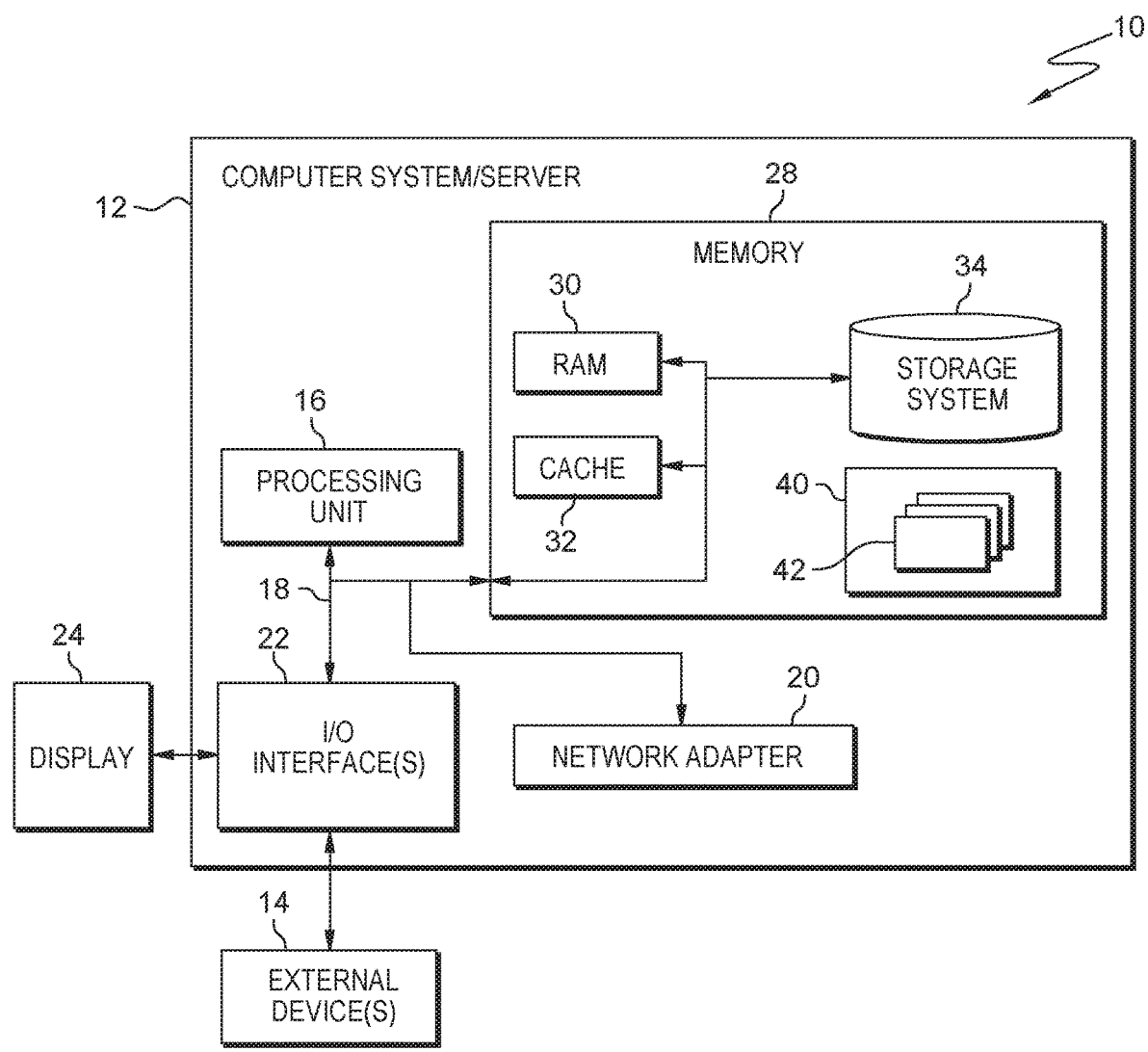
FIG. 2 depicts a block diagram depicting the internal and external components of the server and computing device of FIG. 1, in accordance with one embodiment of the present.

FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

FIG. 2, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 3:
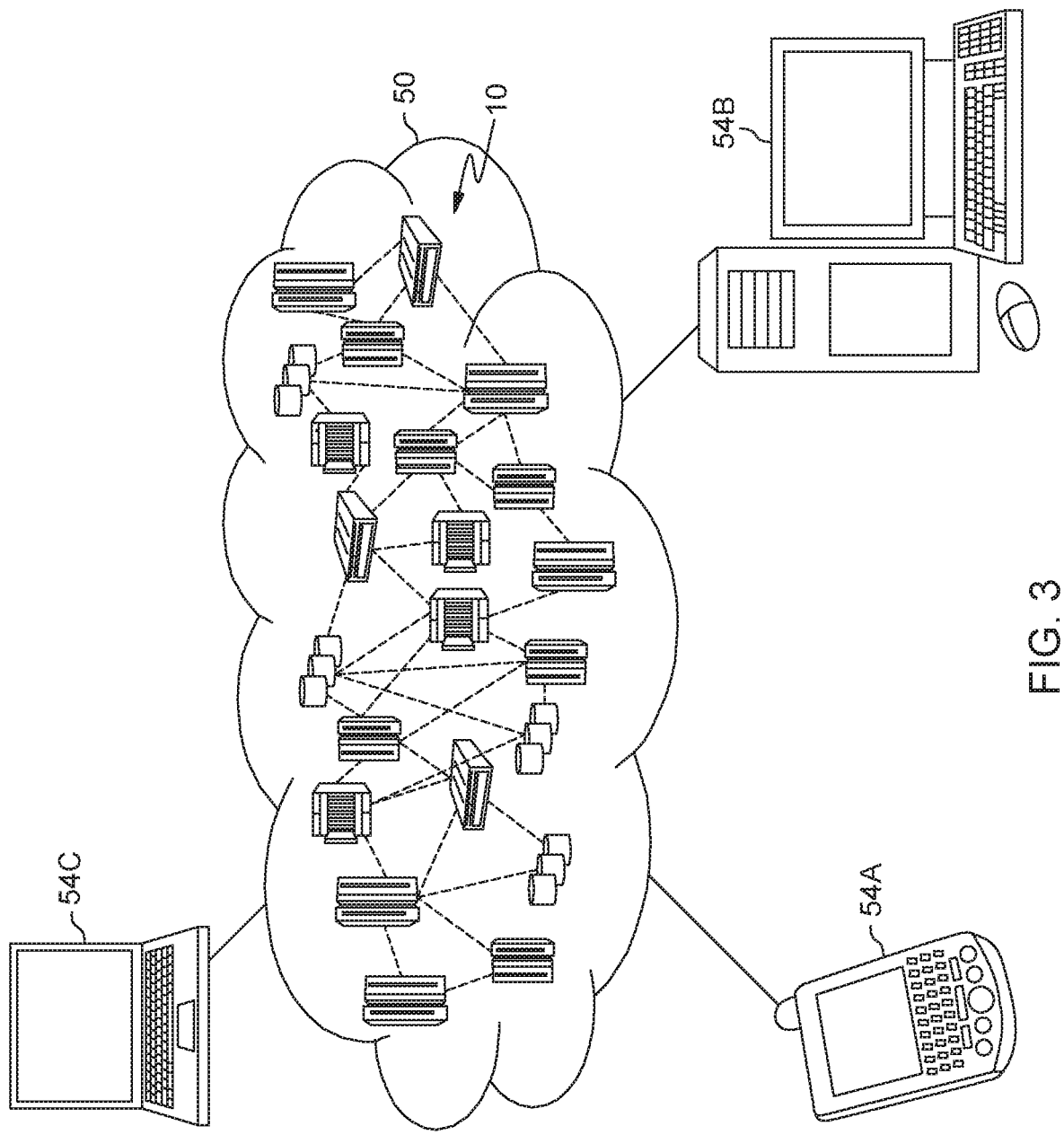
FIG. 3 depicts a cloud computing environment, in accordance with one embodiment of the present invention.

FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or additional computer systems may communicate.

Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 2 are intended to be illustrative only and that computing nodes 10 and cloud computing environment 50 can communicate with any type of computerized device over any type of network and/or network addressable connection (e.g., using a web browser).

Referring back to FIG. 2, the Program/utility 40 may include one or more program modules 42 that generally carry out the functions and/or methodologies of embodiments of the invention as described herein. Specifically, the program modules 42 provides for the roof optimization, roof layout design, truss spacing and design, and load. Other functionalities of the program modules 42 are described further herein such that the program modules 42 are not limited to the functions described above. Moreover, it is noted that some of the modules 42 can be implemented within the infrastructure shown in FIGS. 1-3.

Figure 4:
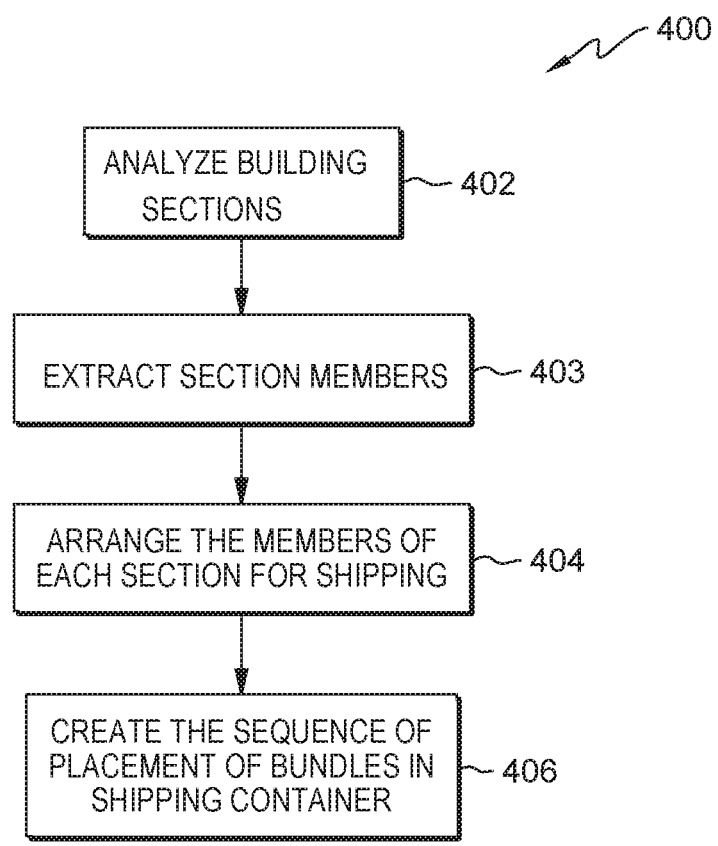
FIG. 4 depicts a flowchart of the operational steps of a method performed by a Shipping Optimization methodology program within the computing environment of FIG. 1, in accordance with one embodiment of the present invention.

FIG. 4 depicts flowchart 400 depicting a method according to the present invention. The method(s) and associated process(es) are now discussed, over the course of the following paragraphs, in accordance with one embodiment of the present invention. The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

In step 402, the shipping optimizing program 108 analyzes each section of the building to identify each member of each section. The sections may be, but not limited to, a wall panel, a roof truss, a floor truss joist or the like (henceforth "section") which is to be manufactured. The shipping optimizing program 108 receives or access a 3D model or a set of drawings related to the overall structure or the specific section of the structure through computing device 104. These sections may be, for exemplary purposes similar to the illustrations shown in FIG. 7. In additional embodiments, the section may be extracted from a 3D model or extracted from a set of drawings. The shipping optimization program 108 identifies a bundle to include all members which are used to fully construction each section. This bundles, which includes all the members of the section and the total length of all the members.

The shipping optimizing program 108 extracts each section member (step 403) to individually identify each section member. This includes, but is not limited to, the length, width, height, profile, and curvature of the members. In some embodiments, where weight is a factor, the shipping optimizing program 108 calculates a weight of the member(s) based on known or calculated material properties.

The shipping optimizing program 108 reviews the size limitations, and in some settings the weight limitations of the shipping container. The shipping container may be an intermodal freight container, or various other shipping container which are used by specific industries.

In some embodiments, the shipping optimizing program 108 reviews the structure design and each section of the structure to analyze how the structure would be constructed.

This would, for example, include the assembly of the first floor, then the second floor, then the roof of a two-story building. The shipping optimizing program 108 analyzes a assembly process of the entire structure and the ordering of the construction of each structure so that the sections which are needed to be assembled first are identified as such.

Figure 6:
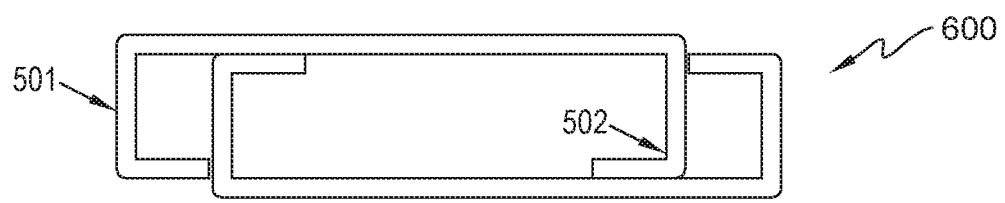
FIG. 6 depicts a view of the cold formed steel studs arranged to fit between each other for shipping, in accordance with another embodiment of the present invention.

In step 404, the shipping optimizing program 108 arranges the members for each section for shipping. In one example, a cold formed steel frame member has a "C" channel design of cold formed members, the members can be arranged in a way to increase the number of members within the container. For exemplary purposes the members 501 and 502 can be arranged as shown in FIGS. 5 and 6, where they are stacked on top of one another or inserted through one another respectively. The shipping optimizing program 108 after having analyzed each the members and the members cross section. The shipping optimizing program 108 is able to arrange the members in rows that provide for the least amount of empty space within the shipping container based on the member profile and the limitations of the shipping container. The shipping optimizing program 108 is able to determine the proper orientation of the members, as shown in FIGS. 5 and 6. In some embodiments, where the members have varying profiles and dimensions, the shipping optimizing program 108 is able to place smaller members within larger members, or orientate the members to minimize the overall space consumer by the members. For example, in FIG. 5, if 502 was sized to fit within the cavity of 501, the shipping optimizing program 108 would place 502 in 501 to save space.

Figure 7:
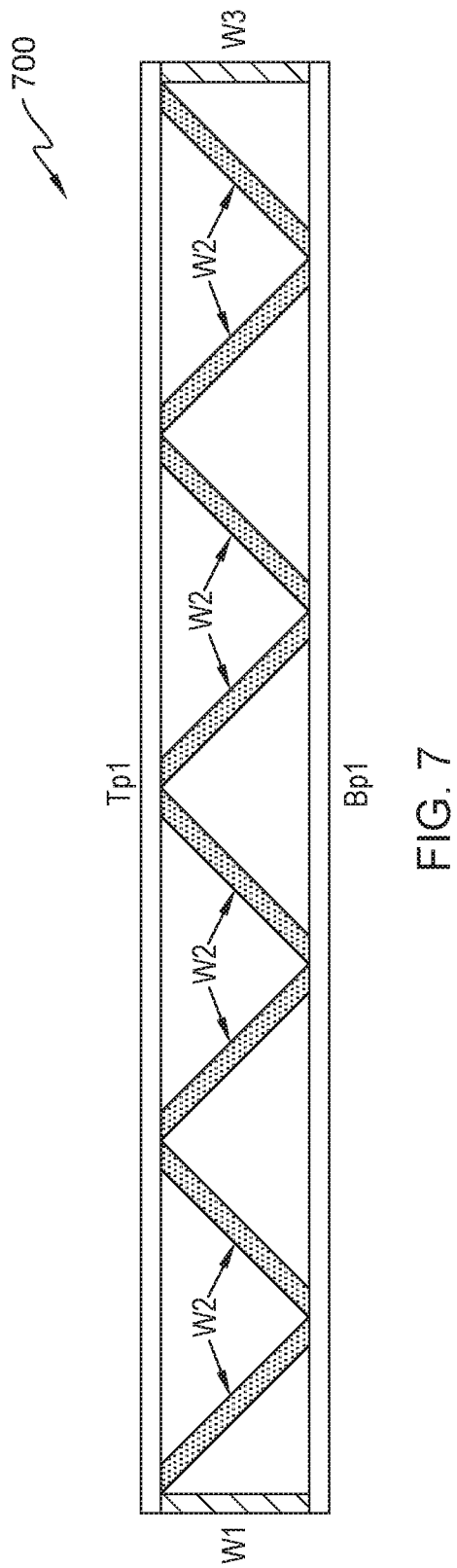
FIG. 7 depicts a floor truss joist elevation view showing the assembled view, in accordance with one embodiment of the present invention.

For example, FIG. 7 shows an embodiment of a floor truss section. This section is comprised of a plurality of members; Tp1, Bp1, W1, and W2. Many of the members are replicas of one of these member types. Through the shipping optimizing program's 108 understanding of each member profile, size, and overall dimensions. The shipping optimizing program 108 is able to generate an arrangement of the members to fit within a container and consume the least amount of space as possible. An example of the bundle is shown in FIGS. 8 and 9. The members are arranged as shown in FIG. 6 and tp1, W2, and W1 are visible due to the stacking method shown in FIG. 6. This reduces the overall volume of the section when placed within the container. The order and placement of the members within the bundle is also calculated by the shipping optimizing program 108. The arrangement of the members is determined through various computer learning systems and artificial intelligence to understand the ideal or preferred assembly process of the section, so that the members are arranged both in a way to decrease the space which is taken up by the bundle, but also the members are placed within the bundle so that once the bundle is removed, the workers are able to take the members from the bundle and easily assemble the section.

In some embodiments, the shipping optimizing program 108 generates drawings or illustrations of the placement of the members within the bundles. The shipping optimizing program 108 creates the drawing for each bundle of each section in most optimized arrangement for consuming the least amount of volume within the container. The member arrangement drawing is prepared to show which members will fit inside which other member and also the double members are stacked on each other so that the volume of each bundle is least volume.

In step 406, the shipping optimizing program 108 creates the sequence in which the bundles are loaded into the container. Through the analysis of the sections and their respective members, the shipping optimizing program 108 with the use of artificial intelligence or computer learning technology, is able to determine which sections need to be assembled first, second, third, etc. The shipping optimizing program 108 both designs the formation of each bundle based on the order in which the bundles are placed within the container. This takes into account both the position of each member within the bundle relative to the assembly process, and the position of each member within the bundle based on the other bundles being placed within the container. So that there is minimal wasted space within the container, and when the bundles are removed the typical order in which they would be assembled to construct the building is how the workers would naturally remove the bundles from the container.

In some embodiments, the shipping optimizing program 108 may alter the bundles based on the overall sequence of which the bundles are loaded into the container. This may include adjusting the overall length of the bundles, the order of the members within the bundles, or possibly combining bundles based on the benefits that the combination may produce.

In some embodiments, the shipping optimizing program 108 creates drawings or illustrations of the bundles within the container to provide for a visual diagram for those placing the bundles within the container. The shipping optimizing program 108 creates the drawings which show the view of the container from various perspectives to show the location of each bundle inside the container such that the maximum space is occupied in the container and there is minimum open space in the container.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalent.

The invention claimed is:

1. A computer method analyzing a 3D building model and generating shipping bundles within modeling software, comprising:
    analyzing, by one or more processors, a 3D building model wherein a set of sections are isolated from the 3D building model;
    identifying, by one or more processors, each of the sets of sections of the 3D building model and a set of data associated with each of the sets of sections, wherein each of sections of the set of sections are comprised of a set of members;
    analyzing, by one or more processors, an assembly process for each of the set of sections, wherein a second set of data is created related to each of the section's assembly processes and a final assembly of the section;
    generating, by one or more processors, an order for the assembly processes of the set of sections and the 3D building model;
    calculating, by one or more processors, properties of each member of the set of members for each section, wherein the properties include a profile of each of the members, and each member type is visually distinct from the other member types;
    determining, by one or more processors, at least one arrangement of the set of members of each of the set of sections, wherein the set of members are rearranged to form a bundle, and wherein the members are arranged in a manner based on the profile of the members and limitations of a shipping container;
    manipulating, by one or more processors, the bundle based on other bundles which are to be placed within the shipping container;
    generating, by one or more processors, a graphical representation of the bundles wherein each of the member types are visually distinct within the bundle; and
    determining, by one or more processors, a manufacturing order, wherein the manufacturing order is used with a forming machine to produce the set of members to form the bundle.

2. The computer method of claim 1, wherein the arrangement of the set of members incorporates the profile of each member, wherein the set of members are arranged to reduce the overall volume of the bundle.

3. The computer method of claim 1, wherein an ordering of the bundles within the shipping container, further comprise, analyzing, by one or more processors, the limitations of the shipping container, wherein the members are arranged within the bundle based on the shipping container limitations.

4. The computer method of claim 1, wherein the properties of the member are the length, width, depth, volume and profile of the member.

5. The computer method of claim 1, wherein the manipulation of the members to form the bundle, further comprises, identifying, by one or more processors, the profile of each member, wherein different orientations of the members based on the profile adjust the volume of the bundle.

6. A computer program product for analyzing a building frame made from members and generating shipping bundles of the members, comprising:
    computer readable non-transitory storage medium having program instructions embodied therewith for generating an assembly process for a building and processing material requirements, the program instructions when executed by a computing device cause the computing device to:
    convert a set of drawing files of a building to form a 3D building model data set, wherein the model is comprised of a set of members;
    analyze the 3D building model to identify a set of sections, wherein the sections are comprised of a group of members;
    perform an analysis on the 3D building model based on the set of sections to form an assembly procedure of the 3D building model and an assembly process of the set of sections;
    manipulate the 3D building model data set to identify individual models of each section, and segregate the sections of the 3D building model, wherein different member types are visually distinct from other member types within each section;
    identify the physical properties of each members;
    arrange the set of members of each section to form a bundle, wherein the bundle is an arrangement of the set of members based on the assembly process of each section and physical properties and the orientation of the members is set so that the bundle has the smallest possible volume, wherein a manipulated assembly of each section is created, and wherein each member type is visually distinct from one another;
    analyzing each bundle within the limitation of a shipping vessel to determine a sequence of placement of the bundles within a shipping container, wherein further modifications of the bundles occurs so that all the bundles are able to fit within the limitations of the shipping vessel;
    present a data set for each bundle, wherein the data set includes different visual characteristics for each of the members;
    generate a graphical representation of each of the bundles, wherein the graphical representation includes a procedure for an assembly process of each of the bundles; and
    provide a manufacturing order of the set of members of each of the bundles to a forming machine, wherein the set of members are formed.

7. The computer program product of claim 6, wherein the arrangement of the set of members incorporates the profile of each member.

8. The computer program product of claim 6, wherein the arrangement of the set of members further includes, analyze the assembly process of the section and arranging the set of members based on an order in which the members are to be assembled.

9. The computer program product of claim 6, wherein an ordering of the bundles within the shipping container, further comprise, adjust the bundles based on a quantity of excess space within the shipping container.

10. The computer program product of claim 6, wherein an ordering of the bundles within the shipping container, further comprise, analyze the assembly process of the sections and arranging the bundles based on the order in which the members are assembled.

11. The computer program product of claim 6, wherein the properties of the member are the length, width, depth, volume and profile of the member.

12. A computer system for an assembly process for a building frame and creating shipping bundles of the building frame, comprising:
 a CPU, a computer readable memory and a computer non-transitory readable storage medium associated with a computing device:
 program instructions to analyze a building model, wherein the building model is comprised of assemblies and the assemblies are comprised of members;
 program instructions to identify member types within the assemblies, wherein the member types have visually distinct characteristics from the other member types;
 program instructions to manipulate the assemblies through a deconstructed process;
 program instructions to identify members which form the assemblies and shading each of the members based on a member type of the assembly;
 program instructions to generate a bundle and associated data files for the bundle from the members of the assemblies, wherein the bundle is a rearrangement of the members of the assembly within a set of limitations of a shipping vessel;
 program instructions to formulate an assembly process from the bundle to the assembly; and
 program instructions to generate a graphical representation of the bundle, wherein the graphical representation includes a procedure for the assembly process of each of the assemblies; and
 program instructions to provide a manufacturing order of the set of members of each of the bundles to a forming machine, wherein the set of members are formed.

13. The computer system of claim 12, wherein an arrangement of the set of members incorporates the profile of each member.

14. The computer system of claim 12, wherein an arrangement of the set of members further includes program instructions to analyze the assembly process of the section and arranging the set of members based on an order in which the members are to be assembled.

15. The computer system of claim 12, wherein an ordering of the bundles within a shipping container, further comprise, program instructions to adjust the bundles based on a quantity of excess space within the shipping container.

16. The computer system of claim 12, wherein an ordering of the bundles within a shipping container, further comprise, program instructions to analyze the assembly process of the sections and arranging the bundles based on an order in which the members are assembled.

17. The computer system of claim 12, wherein the properties of the member are the length, width, depth, volume and profile of the member.

18. The computer system of claim 13, further comprising, manipulating the bundles based on the profile of each member, and determining a bundle's smallest volume.

* * * * *